United States Patent

Glasheen et al.

(10) Patent No.: US 6,354,733 B2
(45) Date of Patent: *Mar. 12, 2002

(54) SYSTEM AND METHOD FOR DETERMINING COMBUSTION TEMPERATURE USING INFRARED EMISSIONS

(75) Inventors: William M. Glasheen; Charles DeMilo; Helmar R. Steglich, all of Wilmington, MA (US)

(73) Assignee: Ametex, Inc., Paoli, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,423

(22) Filed: Jan. 15, 1999

(51) Int. Cl.[7] .................................................. G01J 5/00
(52) U.S. Cl. .................... 374/131; 374/120; 374/130
(58) Field of Search ................................ 374/121, 130, 374/131, 144

(56) References Cited

U.S. PATENT DOCUMENTS

| | | | | |
|---|---|---|---|---|
| 3,795,918 A | | 3/1974 | Sunderland | 356/45 |
| 4,142,417 A | | 3/1979 | Cashdollar et al. | 73/355 |
| 4,306,835 A | | 12/1981 | Hurley | 415/118 |
| 4,410,266 A | | 10/1983 | Seider | 356/45 |
| 4,580,908 A | | 4/1986 | Stewen | 374/130 |
| 4,582,426 A | | 4/1986 | Douglas | 356/43 |
| 4,588,954 A | | 5/1986 | Seymour | 328/151 |
| 4,607,963 A | | 8/1986 | Ulrickson | 374/131 |
| 4,619,533 A | * | 10/1986 | Lucas et al. | 374/141 |
| 4,640,627 A | * | 2/1987 | Tracy et al. | 374/121 |
| 4,652,755 A | | 3/1987 | Solomon et al. | 250/341 |
| 4,657,386 A | | 4/1987 | Suarez-Gonzalez et al. | 356/45 |
| 4,666,297 A | * | 5/1987 | Suarez-Gonzalez | 356/45 |
| 4,679,934 A | * | 7/1987 | Ganguly et al. | 356/43 |
| 4,797,006 A | | 1/1989 | Masom | 374/130 |
| 4,799,787 A | * | 1/1989 | Mason | 356/43 |
| 4,896,965 A | * | 1/1990 | Goff et al. | 356/471 |
| 4,924,478 A | | 5/1990 | Tank | 374/121 |
| 4,979,134 A | | 12/1990 | Arima et al. | 364/557 |

(List continued on next page.)

FOREIGN PATENT DOCUMENTS

| | | | |
|---|---|---|---|
| DE | 4028922 | 6/1991 | F23N/5/08 |
| EP | 0 425 229 A1 | 10/1990 | |
| JP | 60-036825 | 2/1985 | F23N/5/12 |
| JP | 63-040824 | 2/1988 | G01J/5/00 |
| WO | WO89/02069 | 3/1989 | |
| WO | WO93/18494 | 9/1993 | |
| WO | 9807013 | 2/1998 | G01J/5/00 |

OTHER PUBLICATIONS

Sivathanu et al,"Simultaneous Multiline Emission Absorption Measurements in Optically Thick Turbulent Flames", May 6, 1996, pp. 1–21, Zurich Thesis abstract and 25 pp. of Introduction. Translation 1996.

McNesby et al, Rotational Temperature Estimation of CO at High Temperatures by Geographical Methods using FT–IR Spectrometry Applied Spectroscopy, vol. 45, No. 1, 1991.

(List continued on next page.)

Primary Examiner—Diego Gutierrez
Assistant Examiner—Lydia M. De Jesús
(74) Attorney, Agent, or Firm—Hayes, Soloway, Hennessey, Grossman & Hage, P.C.

(57) ABSTRACT

The present invention relates to a combustion temperature sensor, and, more particularly, to a combustion temperature sensor that measures infrared energy emitted at several preselected wavelengths from a flame and/or a flame's hot gas at a turbine inlet location and applies the energy signals to a calculation model to yield temperature.

9 Claims, 8 Drawing Sheets

U.S. PATENT DOCUMENTS

| | | | |
|---|---|---|---|
| 4,998,826 A | | 3/1991 | Wood et al. ............... 374/129 |
| 5,021,980 A | | 6/1991 | Poenisch et al. ............ 364/557 |
| 5,125,739 A | | 6/1992 | Suarez-Gonzalez et al. .. 356/45 |
| 5,186,146 A | * | 2/1993 | Sohma et al. ............... 123/435 |
| 5,203,632 A | | 4/1993 | Fisher et al. ................ 374/144 |
| 5,211,478 A | * | 5/1993 | Horsley ...................... 374/125 |
| 5,246,292 A | * | 9/1993 | Gal et al. ................... 374/121 |
| 5,372,426 A | | 12/1994 | Broudy et al. .............. 374/127 |
| 5,421,652 A | | 6/1995 | Kast et al. .................. 374/208 |
| 5,612,676 A | | 3/1997 | Plimpton et al. ........... 340/578 |
| 5,717,608 A | | 2/1998 | Jensen ........................ 364/557 |
| 5,730,527 A | | 3/1998 | Takayama et al. .......... 374/131 |
| 5,762,419 A | | 6/1998 | Yam ............................. 374/2 |
| 5,772,323 A | | 6/1998 | Felice ........................ 374/127 |

OTHER PUBLICATIONS

Olsson et al, "Apparatus for studying premixed laminar flames using mass spectrometry and fiber–optic spectrometry", American Institute of Physics, vol. 61, No. 3, Mar. 1990.

Suter et al, "Bestimmung von Flammentemperaturen aus Infrarot–Strahlungsintensitaten von H20, CO2 oder Russ" translation is on previous page as Zurich Thesis, 1996.

Sivathanu et al, "Diagnosis of Gas Species Concentrations and Temperatures in laminar Flames", Nov. 97, pp 120–127 Purdue University.

Sivathanu et al, Miniature Infrared Emission Based Temperature Sensor and Light–off Detector, Purdue University, No Date.

Sivathanu, "Rapid Scanning Near–Infrared/Infrared Spectrometer" Phase I Report, Jan. 1997.

Sivathanu, Rapid Scanning Infrared/Near Infraread Spectrometer, Progress Report, Jan. 1998.

* cited by examiner

| LENS DATA | | | | |
|---|---|---|---|---|
| ⌀ L | $T_c$ | $T_e$ | $F_b$ | R (±2%) |
| 11.43mm ±0.03mm | 3.00mm ±0.25mm | 2.05mm ±0.20mm | (21.27mm) | 17.75 mm |

SYSTEM AND METHOD FOR DETERMINING COMBUSTION TEMPERATURE USING INFRARED EMISSIONS

BACKGROUND OF THE INVENTION

1. Field of the Invention

The present invention relates to a combustion temperature sensor, and, more particularly, to a combustion temperature sensor that measures infrared energy emitted at several preselected wavelengths from a flame and/or a flame's hot gas at a turbine inlet location and applies the energy signals to a calculation model to yield temperature. Particular utility for the present invention is in the field of gas turbine engines; although other utilities are contemplated herein.

2. Description of Related Art

Combustion gas turbine designers and users can benefit from knowledge of flame temperature to determine, for example, NOx and CO emission concentrations, flame control, and flame-off conditions. Knowledge of these parameters can be used for increased turbine efficiency, and increased turbine blade life and reliability, as well as decreased pollution. While much effort has been devoted in the past to the problem of flame temperature determination, previously developed systems have been lacking in the ability to come up quickly and reliably with accurate and useful flame temperature measurements.

One example of such a temperature measurement system is shown in Cashdollar et al., U.S. Pat. No. 4,142,417. This patent discloses an IR measuring pyrometer used to calculate both particle and gas temperature from an explosion or fire. In this system three or four IR wavelength measurements (1.57, 2.30, 3.46, and 5.19 um) are obtained to compute temperature of the particles and gas. Significantly, these wavelengths are chosen to avoid discrete emission bands of gases in the hot flame, e.g., those emission bands which correspond to the quantized energies of the vibrational and rotational states of molecules. The wavelength measurements, as provided by Cashdollar et al., are restricted to dust cloud flames which are optically "thick" (i.e., gas cloud flame is optically opaque at the chosen wavelength), to eliminate the need to compensate for background radiation. Thus, this system would be incapable of operating in an optically thin environment, such a turbine, since background radiation from the wall on the other side of the flame would be detected and would destroy any measurement obtained.

In still other prior art examples, temperature measurement is determined by detecting UV radical (e.g., OH, CO, CH, CHO, C, etc.) emission bands in the combustion chamber. For example, German Laid Open Patent Application DE 4028922/A1 and published PCT Application WO 98/07013, each disclose methodologies for temperature determination in a combustion chamber using UV spectral emissions from a variety of gaseous radicals. Radicals, by their very nature, are short-lived as compared to molecular gas constituents, and thus, determination of temperature from molecular gas components is more stable. While UV-spectral combustion temperature determination may be adequate for some purposes, such a system cannot be used for temperature control at the turbine inlet location. In addition, UV combustion temperature determination cannot provide information that can be used to improve turbine blade life and stability.

It has been proposed (e.g., En Urga Paper 1997) to determine temperature by observing the entire IR spectrum and directly correlating certain radiation intensities of molecular $CO_2$ and $H_2O$. However, the harsh operating environment inside the turbine prohibit such a direct measurement. In addition the cost of producing a fiber optic fiber that is capable of both transmitting the entire spectrum without degrading in the harsh operating environment is too prohibitive. Thus, engineering trade-offs must be reached between the ability to effectively observe and transmit optical energy signals within a turbine environment, and to obtain appropriate IR wavelength intensities for accurate temperature measurement.

The present invention solves the aforementioned shortcomings of the prior art by selecting an optical fiber and detector that can withstand the operating environment of a turbine and transmit certain, meaningful wavelengths of optical energy to determine temperature. More specifically, the present invention includes improvements in the relationship of the various elements of the optical system to each other and to the flame. A lens is positioned so that it collects infrared (IR) radiation from that portion of the flame nearest the inlet to the turbine section. The lens focuses the IR energy on one end of an optical fiber, with a mounting structure supporting one end of the optical fiber in fixed relation to the flame. Compressed air is supplied to the mounting structure to shield the lens from combustion gases in the flame. The other end of the fiber is positioned to direct a beam of IR energy onto a plurality of detectors positioned in a second mounting structure spaced from the turbine. A spectral separation mechanism is provided before the detectors to separate the incident IR radiation into a plurality of narrow-range IR frequencies. An optical chopping mechanism is provided for interrupting the IR beam (at a predetermined frequency) before the beam reaches the spectral separating mechanism. In this way, the detector receives a chopped, narrow-range IR signal. The signals are converted to appropriate electrical signals, processed to determine optical energy, and preferably compared to a predefined look-up table to determine a temperature value for a given set of detected optical energy signals.

It should be emphasized that the disclosure in this application includes "best mode" descriptions of preferred related technologies (e.g., temperature calculation via a look-up table) which are not part of the instant claimed invention. This disclosure is amplified for purposes of completeness.

SUMMARY OF THE INVENTION

Accordingly, the present invention provides a system and method for determining combustion temperature using infrared emissions. The present invention includes a sensor, a signal conditioning stage and a temperature determining stage to provide temperature measurement at a turbine inlet location.

In the present invention, an optical system is focused on the flame as the temperature to be measured. As mentioned above, it is desired to measure the flame temperature when the combustion process is essentially complete, i.e., the gaseous products of combustion contain stable compounds of $H_2O$ and $CO_2$. For this purpose, the IR radiation for that portion of the flame closest to the turbine inlet is measured. The resultant optical signal is focused on one end of a fiber optic cable and the other end of the fiber optic cable emits light into an optical detection system. This optical detection system includes an optical chopper, after which the optically chopped signal impinges on a number of separate detectors which convert the optical signal into an electric current. Each of the optical sensors is preferably provided with a selective filter which passes only a very limited, discrete range (i.e., narrow band filter) of infrared wavelength. In the preferred embodiment, four wavelength filters are used: one to pass wavelengths of radiation specifically emitted by $CO_2$, one to pass wavelengths specifically emitted by $H_2O$, one to pass a correlated wavelength of $CO_2$ and $H_2O$, and one to pass a background radiation wavelength. The resultant composite signal is then processed to obtain a stable optical energy signal at each of the selected wavelengths. Preferably, the signal processing includes programmable gain amplifiers and digital to analog circuits for preparation of the signals for computer calculations.

The IR signals must be fed to an optical detector which is subject to careful temperature control so that temperature effects of the detector can be eliminated in so far as is technically feasible. The optical chopper causes a zero optical signal to be available at a given chopping rate (such as 65 Hz) as well as the regular optical signal. Since only the difference between the two signals is used, any DC slow drift is eliminated. In this case, each channels' programmable gain amplifier is controlled by the computer and the signal processing system so that the signal remains in the middle A/D range where accuracy is best. The hardware also includes the use of the digital to analog converters to generate an offset to the signal to assist in further keeping the A/D conversion accurate.

A calibration is also performed. The purpose of calibrating the instrument is to account for component variations from sensor to sensor. Calibration consists of converting an electrical (voltage) signal from each detector element, to an optical (radiation) signal which is used in the software program to determine temperature. A blackbody radiation source is used for this purpose. Since the amount of radiation exiting a blackbody source is well known, there is a direct relation to the detector response. A standard instrument blackbody with emissivity >0.99 has a very well defined spectral emission as a function of its temperature. Optical radiation, at different blackbody temperatures, transmits through the entire optical system, and the voltage response from each of the four detector elements is measured. The detector output as a function of uwatts/steradian-cm is then calculated for each blackbody temperature. These data yield a graph to convert detector reading to the radiation intensity valued that are necessary for flame temperature back calculation.

The temperature calculation is performed by using a multidimensional look-up-table (LUT). The LUT is created by the following four steps. (1) A stochastic simulation is carried out to mimic the $CO_2$ and $H_2O$ concentrations and temperatures over a broad range of values, and over the path length present in the turbine. The $CO_2$ concentrations vary from 0.005 to 0.08 mole fraction and $H_2O$ varies from 0.005 to 0.16 mole fraction. The temperature is varied over the range of interest from 500° C. to 1400° C. (2) The radiation intensities leaving these simulated paths are calculated using a narrow band model such as RADCAL. (3) Preferably, the resultant intensities are first sorted into a four dimensional table, with the radiation at each of the three wavelengths arranged in three columns. The temperature corresponding to the three intensity values are stored in a fourth column, in the four-dimensional LUT. (4) The sorted values are then averaged to provide a convenient number of intensities (typically 8 to 50) along the three dimensions, with temperature forming the fourth dimension. This table forms the LUT.

After the LUT is obtained, it is stored into memory. During operation, one of the intensity values is chosen as a background radiation channel and is used to correct the intensities of the other 3 wavelengths, and the corrected intensities at these three wavelengths are used to find the temperature using a sequential search routine. This search is very fast, since the LUT has been sorted in an ascending (or descending) order. To improve speed, equi-spaced intensities (or the logarithm of the intensities) with indexing can also be used.

The details of the various aspects of the system are described below in more detail hereinafter, and are specifically claimed in the copending application of Sivathanu, application Ser. No. 09/232,424 filed on even date herewith.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
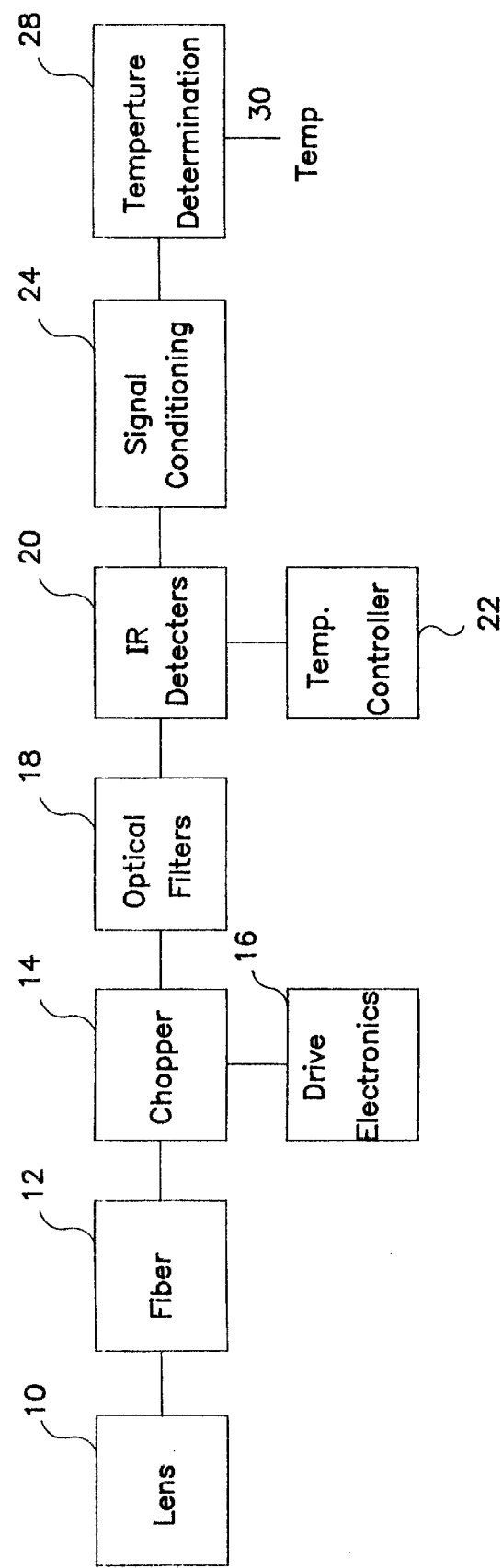
FIG. 1 is a simplified block diagram of the major elements of the system of the present invention.

As an overview, FIG. 1, depicts a block diagram representation of the major elements which make up the various aspects of the invention. A lens 10 focuses an IR image of a flame whose temperature is to be measured onto one end of an optical fiber 12. The other end of the fiber emits the IR radiation through an optical chopper 14 towards a group of optical filters 18 and IR detectors 20. The frequency of the optical chopper 14 is controlled by electronic 16 and the temperature of the IR detectors is controlled by a temperature controller 22 within a narrow, predetermined range (e.g., 0° C., +/−0.05° C.) to prevent DC voltage drifts and thermal voltage effects. Temperature controller preferably includes a Peltier cooler, although other closed-loop cooling systems known in the art are deemed within the scope of the present invention. The electrical output of the IR detectors is fed to a signal conditioning stage 24 to provide a stable optical energy signal for a wide range of operating temperatures. The output from the signal conditioning stage is fed into temperature determination stage 28 to calculate a flame temperature 30. Each of these components of the present invention are discussed in detail below.

Figures 2, 2A:
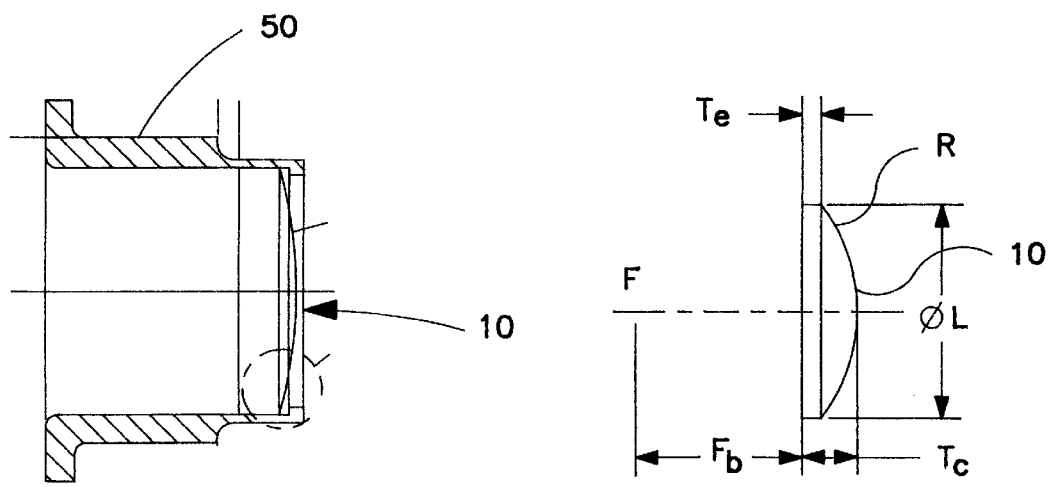
FIG. 2 is a detailed view of a preferred lens assembly (the preferred dimensions of the lens are shown in FIG. 2A)

FIGS. 2 and 2A depict the preferred form of the lens assembly of the present invention. The details and preferred dimensions are tabulated in FIG. 2A. Preferably, the lens 10 is composed of $Al_2 O_3$. To withstand the sever operating environment inside the turbine near the combustion flame, the mount 50 is preferably formed of Kovar® alloyed metal, although other materials capable of withstanding the temperatures and pressures within a turbine are contemplated. Kovar® alloyed metal is preferred when AgCu brazing alloy is used to secure the lens 10 in the mount 50, since Kovar® alloyed metal permits direct brazing. The preferred lens having the dimensions illustrated will give a focal length of about 21.27 mm for a wavelength in the IR range of 2.275–2.885 $\mu$m.

Figure 3:
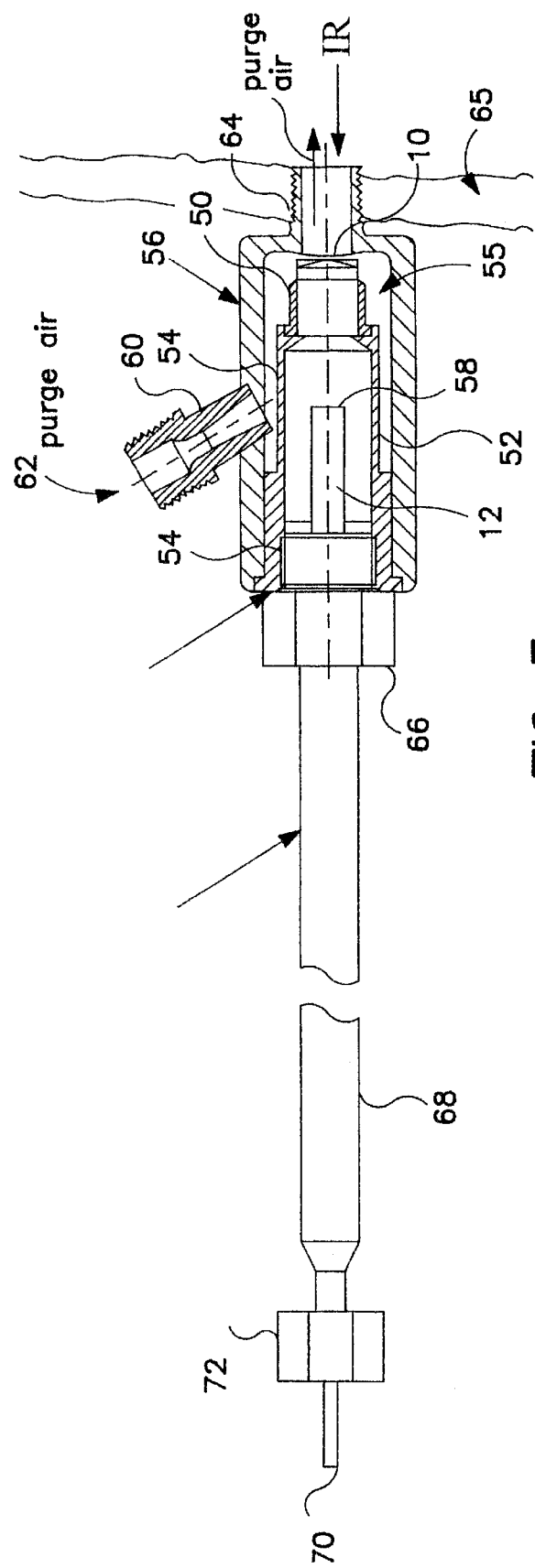
FIG. 3 is a detailed view of lens mounting and fiber optic cable.

In order to mount the lens 10 in a secure position with respect to the IR input end of a fiber optic cable, the preferred design of mounting is constructed as schematically illustrated in FIG. 3. As shown the Kovar® alloyed metal lens mount 50 of FIG. 3 is supported on a mount holder 52 which, at its rear 54, is connected to an outer lens housing 56 and an optical fiber mounting fixture 66, thus permitting a predetermined fixed relationship between lens 10 and the input end 58 of the optical fiber 12. This permits the input of the fiber to be positioned in the approximate focal plane of lens 10 at the IR wavelengths of interest.

As can be seen, there is a space 55 between the lens mount holder 52 and outer mount holder 56. Into this space 55 a supply of high pressure purge air 62 is introduced through air inlet 60. This air is introduced in a tangential fashion to provided radial and circumferential flow through space 55. The purge air exits through fitting 64 which serves also as the mount for the optical system on the side of the turbine combustion chamber, a portion of which is shown at 65. This portion is adjacent to the inlet to the turbine (not shown). The IR signal enters the fitting 64 and impinges on the lens 10 where it is focussed on the end 50 of the optical fiber. Since there is a constant flow of air through fitting 64 into the combustion chamber, no products of combustion can flow into space 55 (where such products might otherwise deposit on the lens 10 resulting in a decrease in IR signal strength and faulty temperature measurement). For convenience, the high pressure air from the turbine compressor stage (not shown) can be used as the purge air source and fed into the fitting, although a dedicated air source is deemed equivalent. This purge air has the dual function of cooling the lens mount and preventing combustion products from approaching the lens.

The fiber optic cable is preferably formed of $Al_2O_3$ for the first meter (or some predetermined distance away from the intense heat and mechanical stress around the combustion flame), starting at the IR input end and then continues as $As_2S_3$ for another meter. These two fibers have a diameter of about 0.4 mm and are optically aligned at their junction and are protected by a fiberglass buffer layer within an outer cable sheath 68 of stainless steel.

Figure 4:
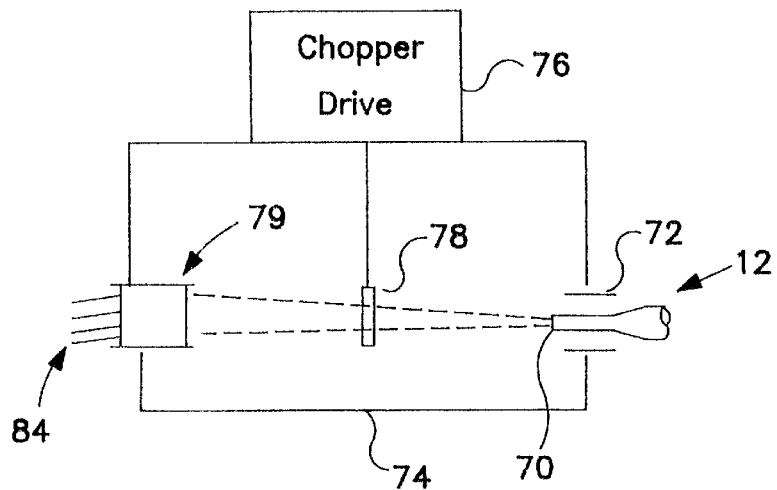
FIG. 4 is a detailed view of the relationship between the fiber optic cable, the optical chopper and the IR detector of the present invention.

At the output end of cable 12, there is provided a cable mounting fixture 72 which suitably secures the cable to the detector housing 74 illustrated schematically in FIG. 4. This detector housing supports the output end of the cable 12 in position to direct the output IR past an optical chopper 78 towards the detector assembly 79. As shown, the optical chopper is placed in the path of the incident radiation between the end of the fiber 12 and the detector 79, and is preferably a tuning fork-type and is driven at 65 Hz by suitable electronics 76. Alternatively, the chopper can be formed with a spinning wheel having a plurality of openings and synchronized (via synchronizing drive electronics, described below) as a function of rotational velocity.

Figures 5A, 5B:
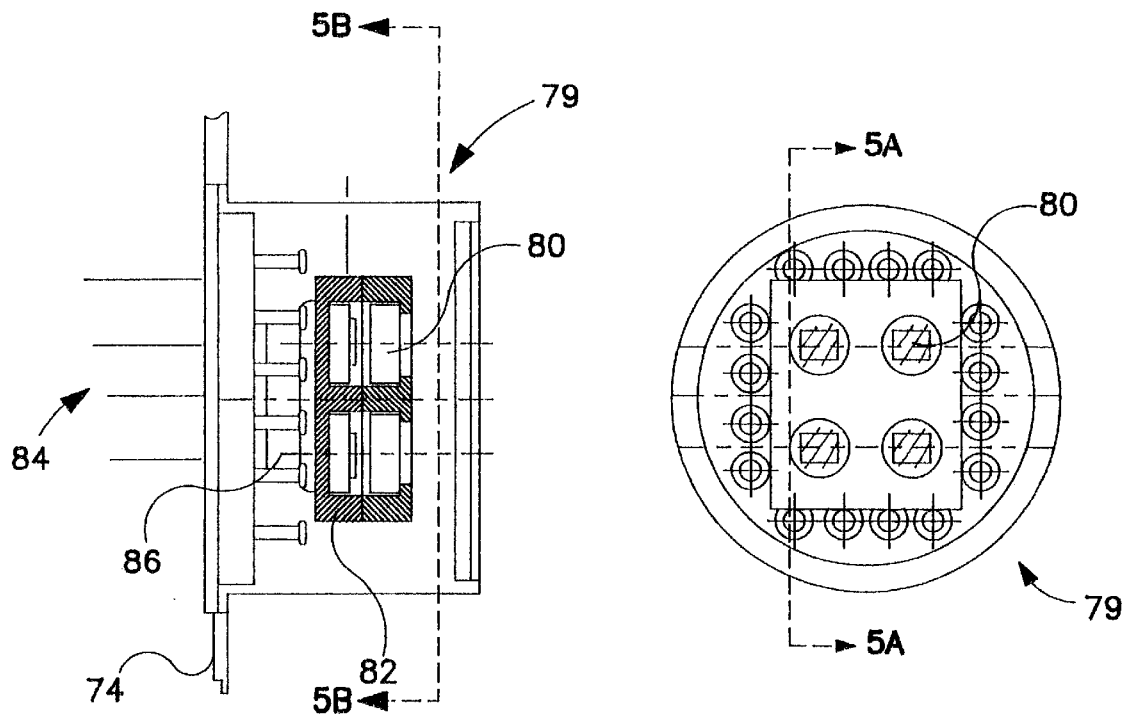
FIGS. 5A and 5B is a side view and front view, respectively, of the preferred IR detector assembly of the present invention.
Figure 9:
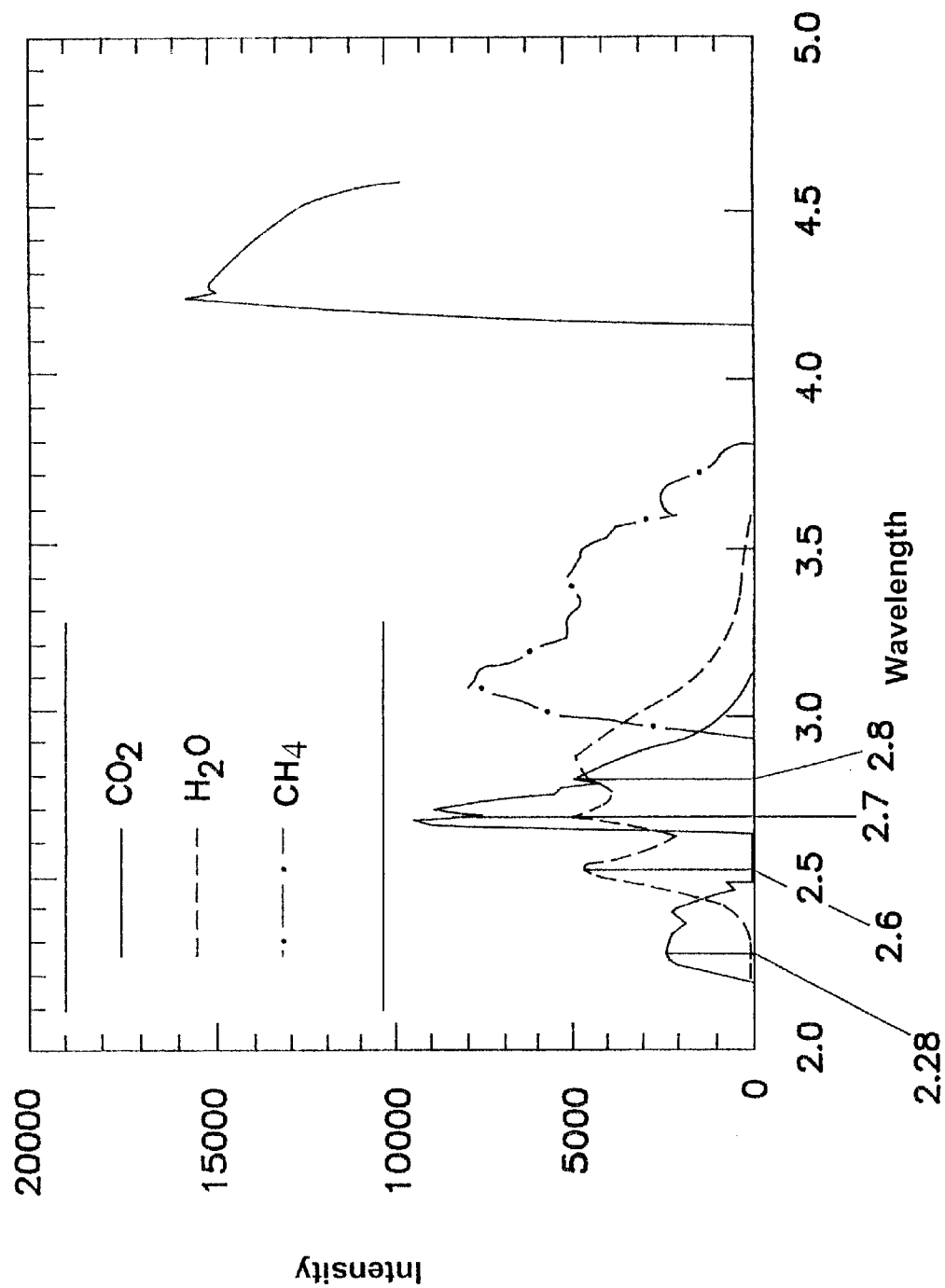
FIG. 9 is a plot of intensity vs. wavelength for several emission spectra.

The IR detector assembly 79 preferably comprises four separate detector elements 82 mounted behind four IR filters 80. A more detailed, enlarged plain view of the assembly 79 are shown in FIGS. 5A and 5B. The detectors 82 are preferably mounted on Peltier coolers 86 for closed-loop temperature control of the detectors. Peltier coolers are known in the art and commercially available. In a preferred embodiment of the invention the detectors 82 are lead sulfide and the four filters having the following peak IR transmissions: 2.28 $\mu$m (+/−0.005 $\mu$m) chosen as a background emission selected to be away from the emission radiation of $CO_2$ and $H_2O$; 2.6 $\mu$m (+/−0.015 $\mu$m) selected as the $H_2O$ emission wavelength; 2.70 $\mu$m (+/−0.015 $\mu$m) selected as the $CO_2$ emission wavelength; and 2.8 $\mu$m (+/−0.005 $\mu$m) selected as a combined $CO_2$ and $H_2O$ emission wavelength. The spectral plot (wavelength vs. intensity) is shown in FIG. 9, and each of the four emission peaks are indicated in this figure. Each of these wavelength are depicted The raw electrical signal from the IR detectors 82 exits through wiring 84.

Figure 6:
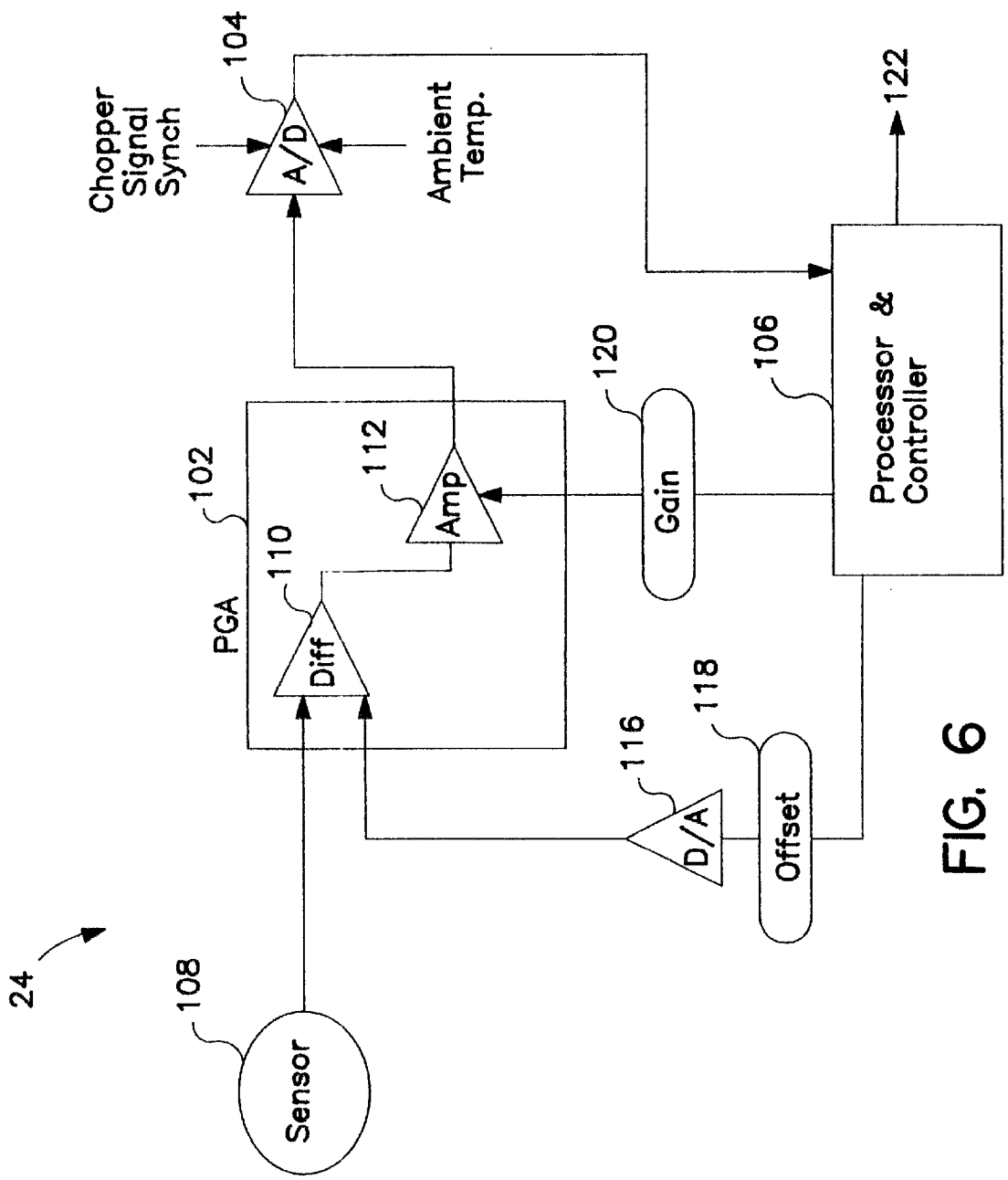
FIG. 6 is a block diagram of the preferred embodiment of the signal conditioning system.

Referring now to FIG. 6, a detailed block-diagram representation of the preferred embodiment of the signal conditioning stage 24 of the present invention is depicted. Essentially, signal conditioning stage 24 consists of a feedback loop utilizing a programmable gain amplifier (PGA) 102, and A/D converter 104 and a digital processor/controller 106. It should be noted at the outset that the circuit shown in FIG. 6 can be duplicated as necessary for each sensor (discussed above), although the A/D converter 104 and the processor/controller 106 are preferably comprised of multiple input devices (via multiplexing, not shown) that can accommodate multiple sensor signal inputs.

As disclosed above, the sensor 108 (which includes the lens, lens housing, fiber optic cable, detector, etc.) preferably includes an electromechanical signal chopper (e.g. an electronically controlled tuning fork, a wheel, etc.) that causes the detector to obtain 2 signals: a "dark" signal when the chopper is closed (i.e., no optical signal is obtained by the sensor), and a "light" signal when the chopper is open. Preferably, the chopper frequency is set at 65 Hz., although other frequencies are envisioned, provided that the associated circuitry shown in FIG. 6 has time to settle between light and dark signals.

The output signals from the sensor are fed into a programmable gain amplifier (PGA) 102. The PGA preferably includes a difference amplifier 110 and a programmable gain amplifier 112, and is utilized to adjust signal level as a function of intensity, and to obtain a signal output that is in the middle of the operating range of the A/D converter 104 to increase overall dynamic range of the system 100. In the preferred embodiment, the A/D converter 104 has inputs from the PGA 102 and the chopper signal synchronizing signal from the signal chopper drive 14. The output is fed into processor/controller 106. Processor/controller 106 obtains the values of the "light" and "dark" signals and calculates and determines appropriate OFFSET 118 and GAIN 120 values, as described below.

Figure 7:
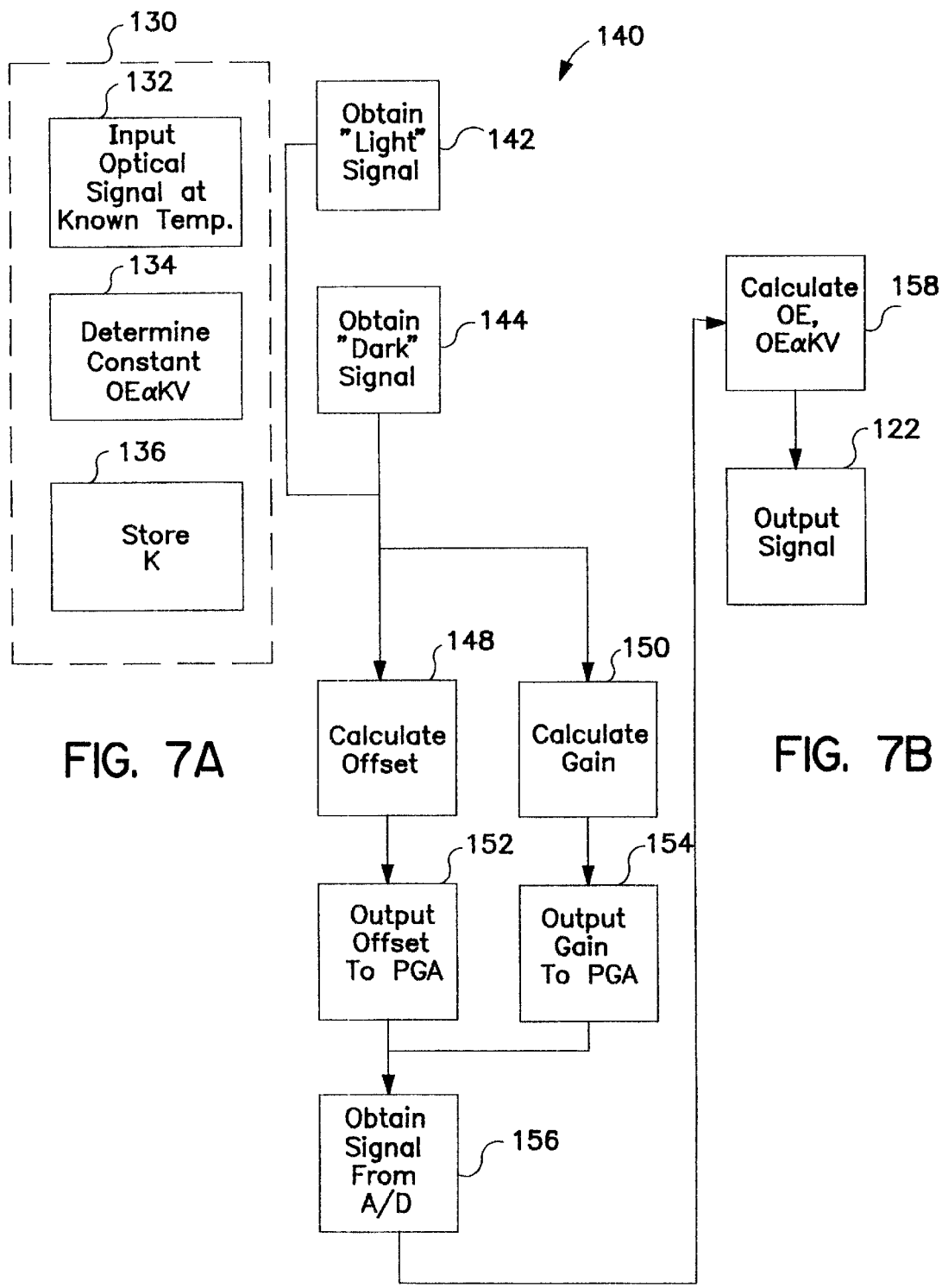
FIGS. 7A and 7B depict the operational flow of the signal conditioning system of FIG. 6.

In block diagram form, the preferred operational flow of the signal conditioning stage 24 is shown in FIG. 7A and 7B.

For clarity, corresponding reference numbers of the components of FIG. 6 are omitted. Before the instrument, which includes the sensor 108 and signal conditioning stage 24, is placed in an operating environment, the sensor and associated electronics embodied in FIG. 6 are calibrated 130 (FIG. 7A). System calibration 130 is provided to obtain a calibration constant (K) for each system. Those skilled in the art will recognize that variations will exist between each component in the instrument (and between instruments), and thus, it is desirable to calibrate each system by determining each system's input/output transfer constant. Thus, each system is measured to determine its operational curve. Optical energy (OE) is related to observed optical voltage (V). Accordingly, an input optical signal of a known temperature is input into the system 132. A blackbody radiation source is preferably used for this purpose, since the amount of radiation exiting a blackbody source is well known, there can obtained a direct relationship with the response of the sensor and associated electronics. Preferably, a standard blackbody with emissivity >0.99 is used having a well-defined spectral emission as a function of temperature. Optical radiation, at different blackbody temperatures, transmits through the sensor 108, and the voltage response from each of the sensors is measured. The detector output (uwatts/steradian-cm) is then calculated for each blackbody temperature. A constant K is determined 134 by observing the output signal as a function of the input signal (optical energy (OE)=K* input voltage). It should be noted that the input/output relationship is not necessarily linear, and thus, K may reflect a nonlinear curve relating input to output. Preferably, several test input values are used to determining a constant for each input, thus, a calibration curve, not shown, is obtained. The processor/controller stores K 136, to be used in calculating optical energy and temperature, discussed below.

The operational flow of conditioning an optical input signal from each sensor (as described above) at a given wavelength, is shown in FIG. 7B, with reference to the system 24 of FIG. 6. From the signal chopper and PGA, the processor/controller obtains the raw values of the "light" signal 142 and the "dark" signal 144, each alternating according to the chopper frequency (e.g. 65 Hz.) synchronized via the A/D converter. Preferably, light and dark signals are obtained at the leading edge and falling edge of the chopper reference signal, respectively. Each value is stored by processor/controller for a predetermined time (e.g., 5 second buffer memory) to compare current values with previous values. The value of the "dark" signal (background radiation) and the "light" signal are used to calculate an OFFSET value 148, which is differentially compared to the chopper signal from the sensor in the PGA 152. Preferably, OFFSET value is determined so that a positive value is always obtained from the PGA. Knowing the amplitude of the signals, processor/controller calculates an appropriate GAIN value 150, and inputs this value to the PGA 154. Preferably, the GAIN dynamically adjusts the raw signal value to keep the amplified signal in the "middle" of the A/D converter input voltage range, thereby increasing dynamic range and avoiding saturation. For example, if the operating voltage range of the A/D is 0 to 5 V., the gain applied will maintain the signal value at approximately 2.5 V. The output of the PGA is fed into the A/D converter and supplied to processor/controller 156. As with the raw signal values, the gain values can be maintained in buffer memory for a predetermined time. Optical energy (OE) is then calculated 158 as a function of input optical intensity (in millivolts) and the calibration constant K (described above), for each of the four wavelengths from the sensor. In the preferred embodiment, four optical energy output signals 122 are obtained from which temperature is determined, as described below.

Figure 8:
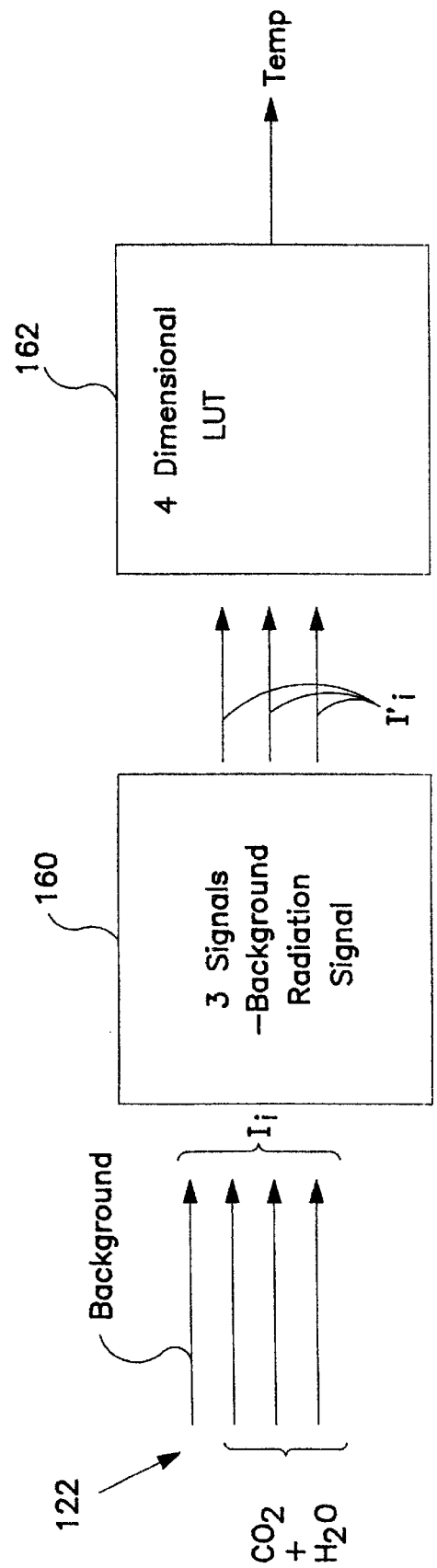
FIG. 8 is a simplified block diagram of the temperature calculation of the present invention.

To determine temperature, the four optical energy signals are provided as inputs to a predetermined lock-up table (described below) in which temperature is back-calculated using known optical energy vs. temperature model calculations. As shown in FIG. 8, three optical energy signals corresponding to $CO_2$ and $H_2O$ emission spectra and one background radiation signal (corresponding to the background radiation from combustion) 122 are determined, from the above-described process. The background radiation signal is subtracted from each of the other three emission signals 160, using a correction factor that corrects for filter widths and relative emissivity at each of the three wavelengths. This correction factor can be assumed constant (i.e., the relationship between the given wavelengths for any given instrument is fixed, and exhibits little, if any, change as a function of optical energy, temperature, etc.). As shown in the figure, $I_r=I_i-I_b$ ($\alpha$); where $\alpha$=the correction factor, $I_i$=the intensity value at a preselected wavelength (in the preferred embodiment, three wavelengths are chose, as described above), and $I_b$=the background intensity value. The calculation is performed at preferably 3 wavelengths: 2.6 $\mu$m (+/−0.015 $\mu$m), 2.70 $\mu$m (+/−0.015 $\mu$m) and 2.8 $\mu$m (+/−0.005 $\mu$m); with wavelength 2.28 $\mu$m (+/−0.005 $\mu$m) being used as the background radiation signal. The three adjusted signals are used as inputs in determining temperature from the look-up table.

The preferred construction of the LUT is described below. Using a narrow-band radiation model, such as provided by commercially available spectroscopy simulation models (e.g., RADCAL: A Narrow-Band Model for Radiation Calculations in a Combustion Environment, Gossander, William L., NIST Technical Note 1402, April 1993), a simulated calculation of radiation intensity (at one or more wavelengths) as a function of (1) path length, (2) temperature, and (3) molar concentration of $CO_2$ and $H_2O$ is obtained. For the present invention and the intended operating environment, the path length (i.e., the distance between the sensor and the turbine wall can be assumed to be homogeneous. In addition, it is known that the temperature range can vary from 900 to 1500 degrees C., and, for hydrocarbon flames, the molar concentration of $CO_2$ and $H_2O$ can vary between 0 and 0.075, and 0 and 0.15, respectively. Thus, a temperature range of 800 to 1600 degrees C., and molar concentration values of 0.01 to 0.08 and 0.01 to 0.16 ($CO_2$ and $H_2O$, respectively) are used. To improve speed, equi-spaced intensities values (or the logarithm of the intensitites) can be used. Thus, for example, the present invention can be adapted to run the calculation using 48 equi-spaced variable values within the above-noted temperature and concentration range. Of course, the present invention can realize a larger number calculations, which would increase the accuracy (by decreasing the error associated with interpolation) at the expense of expanding the size of the LUT.

Ultimately, the only unknown quantity of concern is temperature. Thus, in the preferred embodiment, the LUT comprises three columns of intensity values and one column of corresponding temperature values. To that end, preferably a 4-dimensional look-up table (LUT) 162 is used to determine temperature 164 from the three radiation signals. Of course, the LUT can be constructed in n-dimensions, corresponding to the number of sensor signals used. The resultant table (LUT) is stored as a database (not shown) and is essentially formatted as plurality of columns, one column for each wavelength chosen, and a final column of corresponding temperature values for each row of wavelengths, and is stored in memory (not shown). Referring again to FIG. 8, the three signals 122 received from the signal conditioning stage are compared (e.g., using a search algorithm performed by, e.g., processor/controller 106) to the corresponding intensity values created in the LUT, and a corresponding temperature value is obtained. The processor that receives the radiation intensity values and compares these values to the LUT may be a separate processor without departing from the present invention.

Thus, it is evident that there has been provided a combustion temperature sensor system and method for operating same that fully satisfy both the aims and objectives hereinbefore set forth. It will be appreciated that although specific embodiments and methods of use have been presented, many modifications, alternatives and equivalents are possible. For example, processor/controller 106, A/D converter 104, PGA 102, D/A 116, and LUT (memory) 162 can be any custom made or off-the-shelf components known in the art, and may be provided in one unified system or be part of a modular, interchangeable system, provided that the stated functionality is obtained. Although not shown, system 10 can be adapted with appropriate I/O ports to permit, for example, the signals to be displayed (e.g., using appropriately modified LCD and/or LED display modules) and to provide user-control of the various operational parameters herein described. To that end, the system 10 can include an RS485 digital bus to output the obtained temperature calculation to a display and/or mass storage (not shown). Further modifications are possible. For example, instead of the signal conditioning stage (FIG. 6) as provided herein, the signals received from the sensor 108 can be first fed into an A/D converter and supplied to processor/controller 106 for conditioning. To that end, the signals can be appropriately digitized at a sufficient sampling rate and bit-depth to achieve a desired resolution and dynamic range.

Still other modifications are possible. As described above in reference to the LUT, since each column of the table can be quite large (for example, 48×48×48), the LUT can be appropriately condensed, thereby saving memory space, and modified to optimize a sequential look-up operation. While not wishing to be bound by example, the intensity—temperature table stored in the LUT may be modified as follows. The first column of radiation intensity values can be arranged in ascending (or descending) order, while keeping the corresponding values in the remaining columns in the proper row. The first k values of the first column are averaged to obtain 1 value; where k=n×n; and n is the number of calculations made within the above-noted temperature and molar concentration range. This is repeated n times. The first k values of column 2 are then arranged in ascending (or descending) order, and the first n values are averaged, to obtain 1 value. The first n values in column 3 are then arranged in ascending order, and repeated. Of course, the above process assumes three wavelengths and 1 temperature value, in accordance with the preferred embodiment. However, this process can extend to any given number of wavelengths calculated. It will also be apparent to those skilled in the art that the intensity values obtained by the sensor and those calculated in the LUT may not precisely coincide. Thus, the present invention can be appropriately modified with standard interpolation techniques (e.g., linear, cubic spline, etc.). Alternately, the value of n may be increased so that the distance between any two intensity values for a given wavelength is within error tolerances. In yet another modification, the LUT can be modified to include a curve-fit polynomial expression of intensity-temperature values, which can be approximated for each intensity value obtained by the sensor.

What is claimed is:

1. In a system for measuring IR radiation of a flame in a gas turbine having a combustion chamber and a turbine section, the improvement comprising a lens for collecting infrared radiation from a portion of the flame nearest to an inlet to the turbine section, said lens focusing said infrared radiation on one end of an optical fiber, said lens and optical fiber comprising sapphire, a first mounting means for supporting said lens and the one end of the optical fiber in fixed relation to the flame, means for supplying compressed air to said mounting means to shield said mounting means and said lens from combustion gases in said flame, means for positioning a second end of the optical fiber in position to direct said infrared radiation transmitted by the fiber onto a first infrared filter having a first infrared transmission of 2.28 $\mu$m (+/−0.005 $\mu$m), a second infrared filter having a second infrared transmission of 2.6 $\mu$m (+/−0.015 $\mu$m), a third infrared filter having a third infrared transmission of 2.7 $\mu$m (+/−0.015 $\mu$m), and a fourth infrared filter having a fourth infrared transmission of 2.8 $\mu$m (+/−0.005 $\mu$m), said first infrared filter generating a discrete background infrared radiation wavelength, said second, third and fourth infrared filter each generating a discrete infrared radiation corresponding to $CO_2$ and $H_2O$ gas emissions, each said filter directing said discrete infrared radiation wavelength onto an associated detector, and optical chopping means for interrupting the infrared radiation at a predetermined frequency before it reaches said spectral IR filters.

2. The system of claim 1 wherein said first mounting means are sealed, and the air is directed around the sealed mounting means.

3. The system of claim 2 wherein said sealed mounting means is carried in a separate chamber which communicates with said combustion chamber through an opening in a wall of the combustion chamber and the compressed air enters said combustion chamber through said wall opening to prevent combustion gases from entering said separate chamber.

4. The system of claim 2, wherein the air is fed circumferentially around the first mounting means.

5. The system of claim 1, wherein each of said filter is positioned adjacent each other and passing only a narrow range of infrared radiation frequencies to its associated detector.

6. The system of claim 1, wherein the optical chopper operates at a frequency on the order of 65 Hz.

7. The system of claim 1, wherein said first end of said sapphire optical fiber is positioned in a focal plane of said lens.

8. In a system for measuring discrete IR energies of a flame in a turbine having a combustion chamber and a gas turbine section, the improvement comprising a lens for collecting infrared radiation from a portion of the flame nearest an inlet to the turbine section, said lens focusing said IR radiation on one end of an optical fiber, said lens and optical fiber comprising sapphire, a first mounting means for supporting said lens and one end of the optical fiber in fixed relation to the flame, means for supplying compressed air to said mounting means to shield said mounting means from combustion gases, means for positioning a second end of the optical fiber in position to direct said IR radiation transmitted by the fiber onto a first infrared transmission of 2.28 $\mu$m (+/−0.005 $\mu$m), a second infrared filter having a second infrared transmission of 2.6 $\mu$m (+/−0.015 $\mu$m), a third infrared filter having a third infrared transmission of 2.7 $\mu$m (+/−0.015 $\mu$m), and a fourth infrared filter having a fourth infrared transmission of 2.8 $\mu$m (+/−0.005 $\mu$m), said first infrared filter generating a discrete background infrared radiation wavelength, said second, third and fourth infrared filters each generating a discrete infrared radiation wavelength corresponding to $CO_2$ and $H_2O$ gas emissions, and optical chopping means for interrupting the infrared radiation at a predetermined frequency before it impinges on said filter means, and means for controlling the temperature of said detectors.

9. The system of claim 8, wherein a portion of the fiber optic cable furthest removed from said lens is formed of chalcogenide ($As_2S_3$).

* * * * *

UNITED STATES PATENT AND TRADEMARK OFFICE
CERTIFICATE OF CORRECTION

PATENT NO.   : 6,354,733 B2
DATED        : March 12, 2002
INVENTOR(S)  : Glasheen et al.

It is certified that error appears in the above-identified patent and that said Letters Patent is hereby corrected as shown below:

<u>Title page,</u>
Item [73], Assignee, "Ametex, Inc." should be -- Ametek, Inc. --

Signed and Sealed this

Ninth Day of July, 2002

*Attest:*

*Attesting Officer*

JAMES E. ROGAN
*Director of the United States Patent and Trademark Office*